(12) United States Patent
York

(10) Patent No.: US 7,034,222 B1
(45) Date of Patent: Apr. 25, 2006

(54) ELECTRICAL JUNCTION SYSTEM

(76) Inventor: Roy Wayne York, 8708 E. 134th St. South, Bixby, OK (US) 74008

( * ) Notice: Subject to any disclaimer, the term of this patent is extended or adjusted under 35 U.S.C. 154(b) by 0 days.

(21) Appl. No.: 11/198,951

(22) Filed: Aug. 8, 2005

(51) Int. Cl.
*H02G 3/08* (2006.01)

(52) U.S. Cl. ............................ 174/50; 174/58; 174/60; 220/3.5; 439/535; 248/906

(58) Field of Classification Search .................. 174/50, 174/58, 53, 57, 60, 61, 135, 63, 64; 220/3.3, 220/3.5, 3.94, 4.02; 439/535; 248/906
See application file for complete search history.

(56) References Cited

U.S. PATENT DOCUMENTS

| | | | |
|---|---|---|---|
| 2,410,287 A | 10/1946 | Jaberg | |
| 2,920,303 A | 1/1960 | Johnson | |
| 3,573,344 A | 4/1971 | Snyder | |
| 3,609,647 A | 9/1971 | Castellano | |
| 4,057,164 A * | 11/1977 | Maier ........................ | 220/3.6 |
| 4,103,125 A | 7/1978 | Marrero | |
| 4,165,443 A | 8/1979 | Figart et al. | |
| 4,336,418 A | 6/1982 | Hoag | |
| 5,646,371 A * | 7/1997 | Fabian ........................ | 174/58 |
| 6,188,022 B1 * | 2/2001 | He .............................. | 174/58 |
| 6,384,334 B1 * | 5/2002 | Webb .......................... | 174/58 |
| 6,617,511 B1 | 9/2003 | Schultz et al. | |
| 6,943,295 B1 * | 9/2005 | Herth ......................... | 174/58 |
| 6,953,894 B1 * | 10/2005 | Ungerman et al. .......... | 174/58 |

* cited by examiner

*Primary Examiner*—Dhiru R. Patel
(74) *Attorney, Agent, or Firm*—Gable and Gotwals

(57) ABSTRACT

An electrical junction system includes a junction box specially configured to enhance electrical circuitry installation in buildings or other structures. The junction box is attached to a wall stud or other structure and electrical power is routed to the box. Installation of utility modules (such as a receptacle or switch) into the junction box requires no connection of wires. In addition, the depth at which the utility module is secured within the junction box cavity is advantageously adjustable to enable the face of the module to be mounted at a desired location, such as flush with drywall.

23 Claims, 4 Drawing Sheets

ELECTRICAL JUNCTION SYSTEM

FIELD OF THE INVENTION

The present invention relates generally to electric components. More particularly, the present invention relates to an electrical junction system with adjustment features to enhance installation of switches, receptacles and like components.

BACKGROUND OF THE INVENTION

Electrical circuitry installation in buildings is a time consuming task. In a typical installation, an electrician attaches junction boxes to exposed wall studs at predetermined locations throughout the building. Wires carrying electrical power are then routed and interconnected between the circuit breaker panel and the individual junction boxes. At the junction box, the power wires are usually capped with a wire nut for safety reasons and then left for later connection to utility modules such as switches and receptacles. Next, municipal authorities inspect the installation to ensure applicable codes and requirements are being met. Once approved, drywalls are attached to the studs and openings in the wall are provided to allow access to the junction boxes. The electrician then resumes work and installs utility modules in each of the junction boxes by attaching the power wires directly to the utility module. Lastly, a cover plate is attached to the junction box to complete the installation.

Installation of the utility module in the above-described manner presents a number of problems. Not only is the electrician's job time consuming and labor intensive, the electrician is also exposed to the hazards associated with handling potentially live electrical power wiring. The electrical installation is also prone to error. For example, if the junction box is not properly positioned on the wall stud (i.e, positioned too far forward or back), the front of the utility module may not be flush with the drywall when it is attached to the junction box. This error is very difficult to correct because at the point when the utility module is installed, the drywall has already been put in place. In order to access the junction box for re-positioning on the stud, a section of the drywall must be removed. Thus, it can be seen that installation of junction boxes and their utility modules can be unforgiving if the junction box is not properly mounted to the wall stud.

What is needed, therefore, is an improved electrical junction system that eliminates or improves upon one or more problems with conventional systems.

BRIEF SUMMARY OF THE INVENTION

The present invention achieves its objectives by providing an electrical junction system with a specially configured junction box. The junction box includes a plurality of interconnected walls with an opening into a cavity defined by the walls. A post secured to a wall of the junction box extends through at least a portion of the cavity toward the opening. The junction box also includes a plurality of electrically conductive pads and a terminal to receive a plurality of electrical power conductors. Electrical continuity between the terminal and pads is established by electrically conductive paths, such as conductive traces positioned adjacent one or more walls of the junction box. The system further includes a utility module (such as a receptacle or a switch) having a front, a back in opposed relation to the front, and a plurality of movable contacts (such as spring contacts) for establishing electrical continuity between the utility module and the electrically conductive pads of the junction box. An adjustable fastener is used to secure the utility module to the post substantially within the junction box cavity with the movable contacts of the utility module in electrical continuity with the conductive pads of the junction box. The adjustable fastener is operable to adjust the depth at which the utility module is secured within the junction box cavity. A cover is attached to the junction box adjacent the opening to complete the installation.

The post and fastener may interact with one another in a multitude of ways to secure the utility module in the junction box. For example, in one embodiment the post is threaded and two nuts are positioned on either side of the utility module to secure the module to the post by compressive force. In another embodiment, the post is threaded and secured in a way that enables the post to spin about its central axis. For this embodiment, a threaded through opening formed in the utility module is sized and configured to engage the threaded post so that as the post is spun about its central axis, the depth of the utility module is adjusted.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
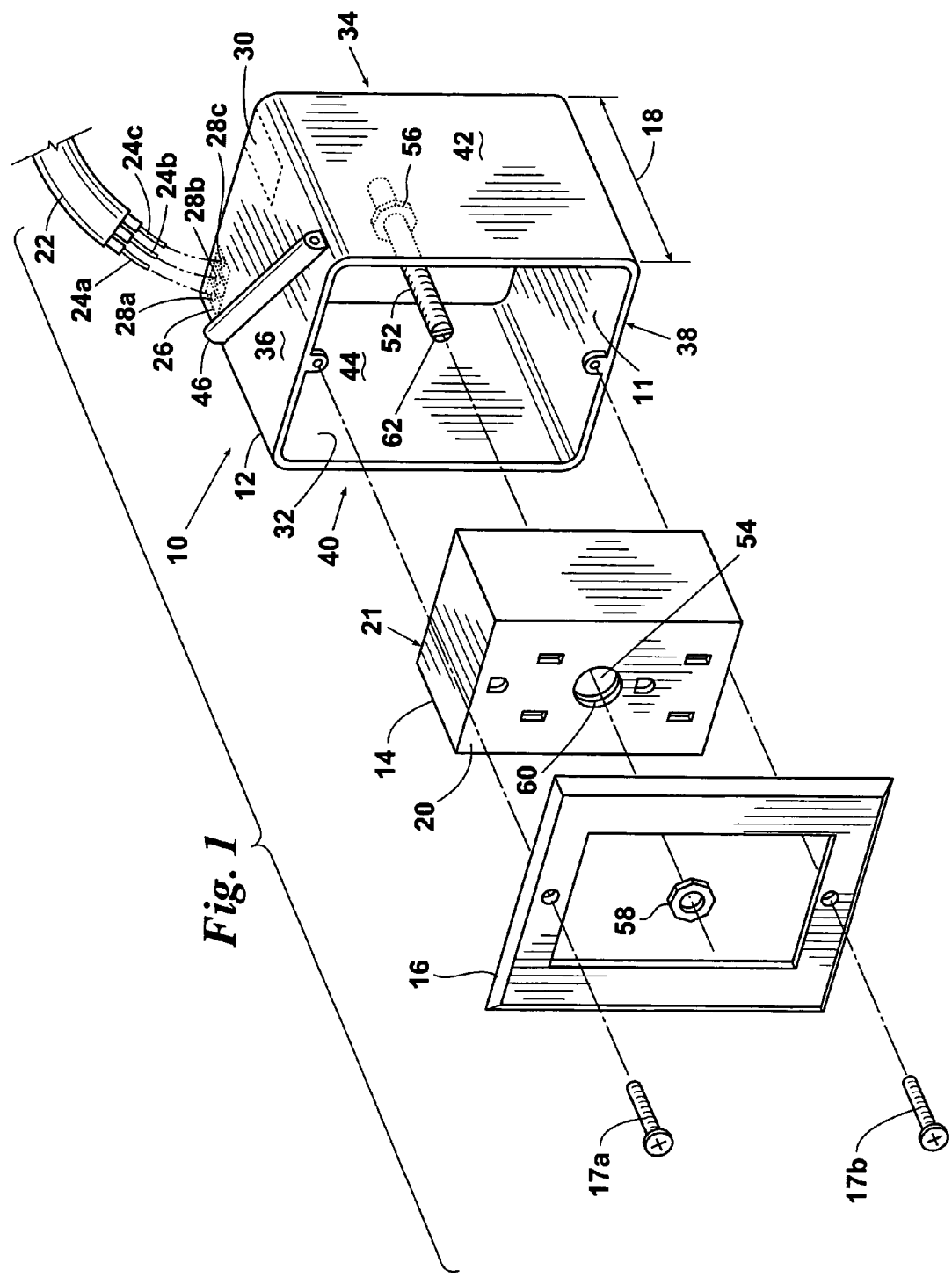
FIG. 1 is an exploded view of an electrical junction system having a junction box and a utility module (in the form of an electrical receptacle) according to the invention.
Figure 5:
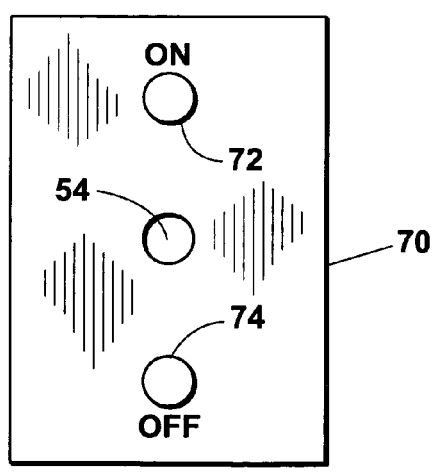
FIG. 5 is a front view of a switch for use as a utility module in an electrical junction system according to the invention.
Figure 4:
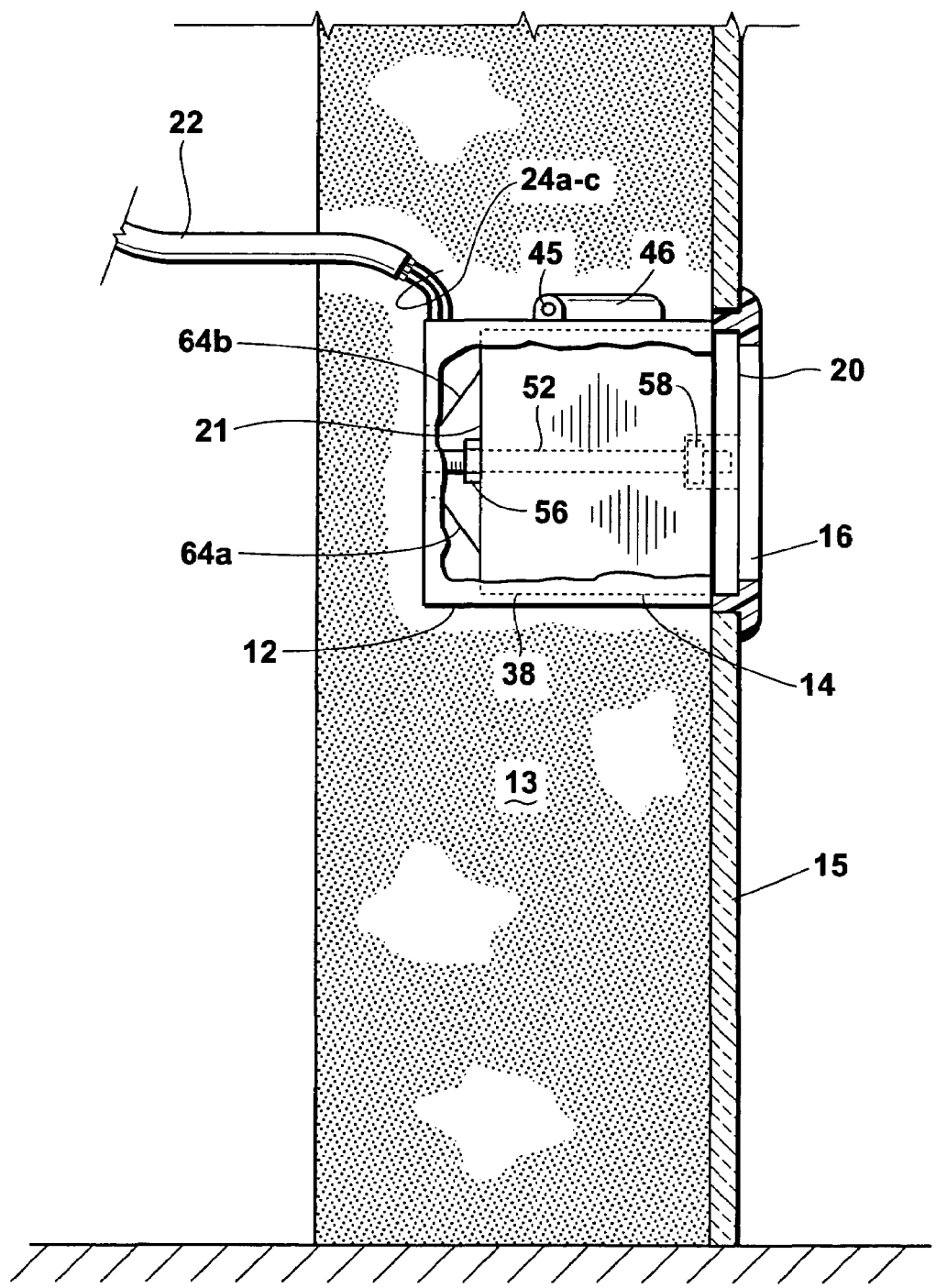
FIG. 4 is a sectional view of the electrical junction system of FIG. 1 mounted to a wall stud.

Turning now to the drawings wherein like reference characters indicate like or similar parts throughout, FIGS. 1 and 4 illustrate one embodiment of an electrical junction system 10. The system 10 includes a junction box 12 for being attached to structure such as a wall stud 13, a utility module 14 (such as a receptacle as shown in FIG. 1 or a switch as shown in FIG. 5) for being secured substantially within the junction box 12, and a cover plate 16 for being attached to the junction box 12 adjacent an opening 11 in the box 12. The system 10 is advantageously configured such that, when the junction box 12 is mounted and electrical power is provided to the box 12, the electrician can complete installation without any further handling of potentially live electrical wires. In this manner, the system 10 enhances safety. In addition, the depth (generally indicated by directional arrow 18) at which the utility module 16 is secured within the junction box 12 is adjustable. This aspect of the system 10 is particularly advantageous when the junction box 12 is not properly installed and results in the utility module 14 being mounted in an undesirable orientation or position. For example, it is generally desirable for the front 20 of the utility module 14 to be flush with the drywall 15 or other wall type. The adjustable aspect of the system 10 enables the electrician (or other installer) to obtain the desired flush mounting or orientation even when the junction box 12 is not properly positioned.

With continued reference to FIGS. 1 and 4, an electrical power cable 22 or other electrical conduit contains wires 24a–c for supplying electrical power to the junction box 12. In the embodiment of FIG. 1, AC power is provided. However, it will be understood that power cable 22 may carry non-AC power as well. Wires 24a–c are secured to a terminal 26 of the junction box 12 by any suitable manner of attachment, such as by frictional engagement of the wires 24a–c when the wires 24a–c are inserted into holes 28a–c formed in the terminal 26. Alternatively, the wires 24a–c are secured to the junction box terminal 26 by clamping action or any other suitable action. Preferably, the junction box 12 includes one or more spare break-out panels 30 to accommodate additional terminal types and/or wiring.

Although the junction box 12 may be any suitable geometric configuration, the junction box 12 shown in FIGS. 1 and 4 is generally orthogonal with an open front 32 and a plurality of interconnected walls including back wall 34, top wall 36, bottom wall 38, left wall 40 and right wall 42 with a cavity 44 defined thereby. A channel 46 or other suitable structure formed along the top 36 is used to attach the junction box 12 to a support structure by driving a nail 45 or other suitable fastener through the channel 46 and into wall stud 13.

Figure 2:
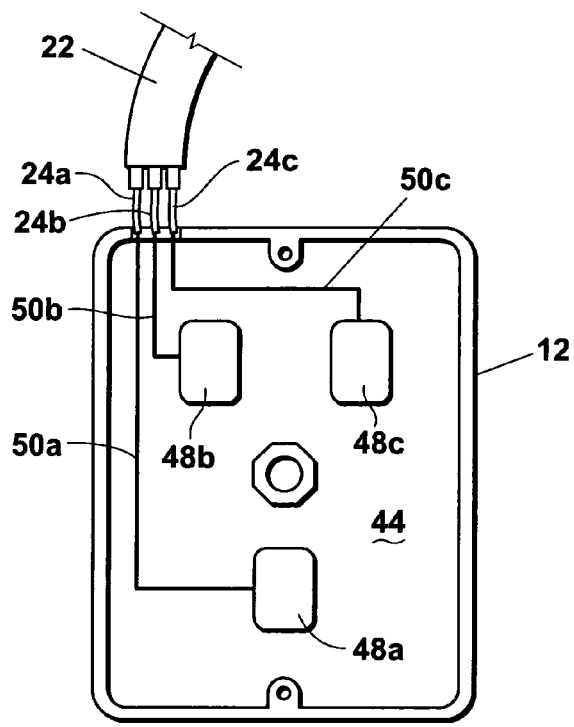
FIG. 2 is a front view of the junction box of FIG. 1.

As shown in FIG. 2, a plurality of electrically conductive pads 48a–c are positioned within cavity 44 adjacent the back 34 of the junction box 12. Electrical power carried by power cable 22 and its wire conductors 24a–c is conducted to pads 48a–c by way of electrically conductive paths 50a–c interconnecting each of the conductors 24a–c with a pad 48a–c. As shown in FIG. 2, each of the electrically conductive paths 50a–c may be in the form of an electrically conductive trace formed adjacent the back 34 of the junction box 12. However, it will be understood that other forms of electrically conductive paths (such as wires) may be employed as well.

Referring again to FIG. 1, a preferred manner of securing utility module 14 substantially within cavity 44 will now be described. A post 52 is secured to the back 34 of junction box 12 and extends from the back 34 through at least a portion of cavity 44 toward opening 11. Post 52 may be rigidly attached to back 34, or post 52 may be attached in a way that enables the post 52 to spin about its central axis. A through opening 54 formed in the utility module 14 extending from front 20 to back 21 is sized to receive the post 52. The utility module 14 is inserted substantially within cavity 44 with post 52 extending into through opening 54. Utility module 14 is then secured to post 52 with an adjustable fastener. By "adjustable fastener", what is meant is a fastener that is capable of being moved along at least a portion of the length of post 52 to maintain a desired position of the utility module 14 within cavity 44. In a preferred embodiment, post 52 is threaded and the adjustable fastener includes a stop nut 56 positioned on post 52 adjacent the back 21 of the utility module 14 and a securing nut 58 positioned on post 52 adjacent the front 20 of utility module 14. A lip 60 formed within through opening 54 adjacent the front 20 of utility module 14 is sized to engage securing nut 58 and enables the securing nut 58 to bear against the utility module 14 and be recessed within through opening 54. Stop nut 56 similarly bears against the back 21 of the utility module 14 or against a recessed lip so that when the securing nut 58 is tightened, utility module 14 is secured to the post 52 by compression of the utility module 14 between nuts 56, 58. The depth 18 at which the utility module 14 is secured within the junction box 12 can be adjusted by moving stop nut 56 along the length of post 52.

Installation of utility module 14 may be enhanced by attaching post 52 to back 34 in a way that enables the post 52 to spin about its central axis. A notch 62 formed in the free end of post 52 enables the installer to apply a screwdriver or other suitable tool to spin post 52 relative to nuts 56, 58 to aid in the installation or removal of the utility module 14.

In an alternate embodiment, post 52 is unthreaded and the adjustable fastener includes a clamp on either side of the module 14 to secure the module substantially within cavity 44 by frictional engagement of the clamps to the post.

Figure 6:
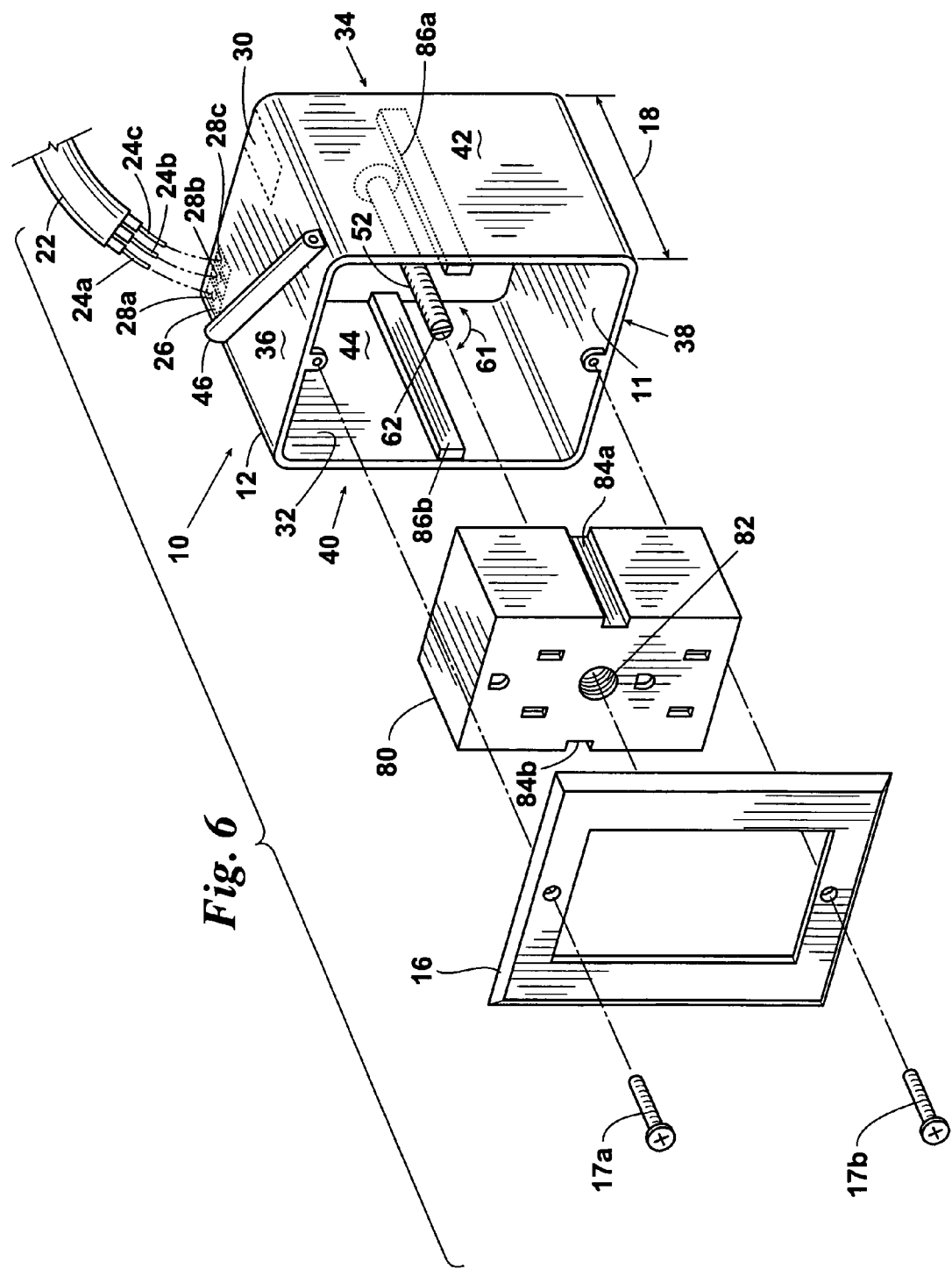
FIG. 6 is an exploded view of an alternate embodiment of the electrical junction system of FIG. 1.

In a further alternate embodiment shown in FIG. 6, post 52 is threaded and secured to the back 34 of junction box 12 in a way that enables the post to spin about its central axis as indicated by direction arrow 61. The adjustable fastener includes a threaded through opening 82 formed in utility module 80 and sized to engage post 52. With the use of a srewdriver or other suitable tool, the installer rotates or spins post 52 in one direction to draw utility module 80 into cavity 44. Spinning post 52 in the opposite direction extends utility module 80 outwardly from cavity 44. To help maintain proper orientation and stability of the utility module 80 as its depth within cavity 44 is adjusted, channels 84a, 84b may be provided in utility module 80 as needed or desired. The channels 84a, 84b are sized and configured to engage corresponding guide rails 86a, 86b formed within cavity 44 so that as utility module 80 is moved along post 52, the orientation of utility module 80 is enhanced.

Installation of the junction box system 10 of FIGS. 1 and 6 is completed by attaching cover plate 16 to junction box 12 with one or more screws 17a, 17b or other suitable fastener.

Figure 3:
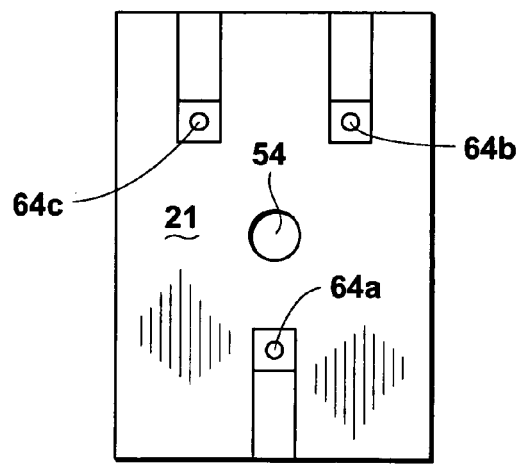
FIG. 3 is a back view of the utility module of FIG. 1.

With reference to FIG. 3, movable contacts 64a–c attached to the back of utility module 14 are spatially arranged to match and engage the spatial arrangement of conductive pads 48a–c at the back 34 of the junction box 12 when the utility module 14 is installed, thereby establishing electrical continuity between the utility module 14 and conductive pads 48a–c. Use of the term "pad" herein is not limited to an electrical contact of substantially flat, thin proportions. By "pad", what is meant is any type or configuration of an electrical contact that is suitable for providing an electrically conductive surface onto which the movable contacts 64a–c of the utility module 14 may be placed without direct manipulation of either the conductive pad 48a–c, conductive path 50a–c, or movable contact 64a–c during installation of the utility module 14. Contacts 64a–c are movable to enable the depth 18 (FIG. 1) at which the utility module 14 is secured within the junction box 12 to be adjusted inwardly or outwardly as needed or desired. In the embodiments of FIGS. 3 and 4, movable contacts 64a–c are spring contacts. However, it will be understood that any movable contact type suitable for maintaining contact with conductive pads 48a–c as utility module depth 18 is adjusted may be employed as well.

Although FIG. 1 shows utility module 14 as an electrical receptacle, it will be understood that other types of modules may be employed as well, including a switch 70 as shown in FIG. 5 having a through opening 54, an ON button 72 and an OFF button 74.

It will be appreciated that the electrical junction system 10 described herein provides numerous advantages not realized by existing systems. For example, the described system 10 enables the installer to easily adjust the depth 18 of the utility module 14, 80 to accommodate any imperfections in the positioning of the junction box 12. In addition, the system 10 eliminates the need to connect wires within the junction box 12, which enhances safety and speeds installation. Also, since there are no wires present within the junction box cavity 44, the junction box 12 can be made smaller, which reduces costs.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. An electrical junction system comprising:
    a junction box having:
        a plurality of interconnected walls with an opening into a cavity defined by said plurality of interconnected walls;
        a post secured to one of said walls of the junction box and extending through at least a portion of the cavity toward the opening;
        a terminal for receiving a plurality of conductors of electrical power;
        a plurality of electrically conductive pads; and
        a plurality of electrically conductive paths interconnecting each of said plurality of conductors of electrical power with one of said conductive pads to establish electrical continuity therebetween;
    a utility module having:
        a front;
        a back in opposed relation to said front; and
        a plurality of movable contacts for establishing electrical continuity between the utility module and said plurality of electrically conductive pads;
    an adjustable fastener for securing the utility module to the post substantially within the junction box cavity with the movable contacts of the utility module in electrical continuity with the conductive pads of the junction box, said adjustable fastener being operable to adjust the depth at which the utility module is secured within the junction box cavity; and
    a cover for being attached to the junction box adjacent the opening.

2. The electrical junction system of claim 1 wherein said utility module is an outlet.

3. The electrical junction system of claim 1 wherein said utility module is a switch.

4. The electrical junction system of claim 1 wherein said post is threaded and said adjustable fastener includes:
    a stop nut positioned on said post adjacent the back of the utility module; and
    a securing nut positioned on said post adjacent the front of the utility module so as to secure the utility module to the post by compression when the securing nut is tightened.

5. The electrical junction system of claim 1 wherein said post is threaded and secured to a wall of the junction box in a way that enables the post to spin about its central axis, said adjustable fastener further including a threaded through opening formed in the utility module and sized and configured to engage the threaded post so that the depth of the utility module within the junction box cavity is adjusted as the post is spun about its central axis.

6. The electrical junction system of claim 1 wherein each of said plurality of movable contacts is a spring contact.

7. The electrical junction system of claim 1 wherein each of said plurality of conductors is an electrically conductive trace adjacent one of more walls of the junction box.

8. The electrical junction system of claim 1 wherein each of said plurality of conductors is a wire.

9. The electrical junction system of claim 1 wherein said plurality of interconnected walls includes:
    a back wall;
    a top wall;
    a bottom wall in opposed relation to said top wall;
    a left wall; and
    a right wall in opposed relation to said left wall.

10. An electrical junction system comprising:
    a junction box having:
        a plurality of interconnected walls with an opening into a cavity defined by said plurality of interconnected walls;
        a threaded post secured to one of said walls of the junction box and extending through at least a portion of the cavity toward the opening;
        a terminal for receiving a plurality of conductors of electrical power;
        a plurality of electrically conductive pads; and
        a plurality of electrically conductive paths interconnecting each of said plurality of conductors of electrical power with one of said conductive pads to establish electrical continuity therebetween;
    a utility module having:
        a front;
        a back in opposed relation to said front; and
        a plurality of movable contacts for establishing electrical continuity between the utility module and said plurality of electrically conductive pads;
    an adjustable fastener for securing the utility module to the post substantially within the junction box cavity with the movable contacts of the utility module in electrical continuity with the conductive pads of the junction box, said adjustable fastener including:
        a stop nut positioned on said post adjacent the back of the utility module; and
        a securing nut positioned on said post adjacent the front of the utility module so as to secure the utility module to the post by compression when the securing nut is tightened;
        wherein said adjustable fastener is operable to adjust the depth at which the utility module is secured within the junction box cavity; and
    a cover for being attached to the junction box adjacent the opening.

11. The electrical junction system of claim 10 wherein said utility module is an outlet.

12. The electrical junction system of claim 10 wherein said utility module is a switch.

13. The electrical junction system of claim 10 wherein each of said plurality of movable contacts is a spring contact.

14. The electrical junction system of claim 10 wherein each of said plurality of conductors is an electrically conductive trace adjacent one of more walls of the junction box.

15. The electrical junction system of claim 10 wherein each of said plurality of conductors is a wire.

16. An electrical junction system comprising:
    a junction box having:
        an open front;

a back in opposed relation to said front;
a top;
a bottom in opposed relation to said top;
a left side;
a right side in opposed relation to said left side;
a cavity defined by said front, back, top, bottom, left side and right side;
a post secured to the back and extending through at least a portion of the cavity toward the front;
a terminal for receiving a plurality of conductors of electrical power;
a plurality of electrically conductive pads; and
a plurality of electrically conductive paths interconnecting each of said plurality of conductors with one of said conductive pads to establish electrical continuity therebetween;
a utility module having:
a front;
a back in opposed relation to said front; and
a plurality of movable contacts for establishing electrical continuity between the utility module and said plurality of electrically conductive pads;
an adjustable fastener for securing the utility module to the post substantially within the junction box cavity with the movable contacts of the utility module in electrical continuity with the conductive pads of the junction box, said adjustable fastener being operable to adjust the depth at which the utility module is secured within the junction box cavity; and
a cover for being attached to the front of the junction box.

17. The electrical junction system of claim 16 wherein said utility module is an outlet.

18. The electrical junction system of claim 16 wherein said utility module is a switch.

19. The electrical junction system of claim 16 wherein said post is threaded and said adjustable fastener includes:
a stop nut positioned on said post adjacent the back of the utility module; and
a securing nut positioned on said post adjacent the front of the utility module so as to secure the utility module to the post by compression when the securing nut is tightened.

20. The electrical junction system of claim 16 wherein each of said plurality of movable contacts is a spring contact.

21. The electrical junction system of claim 16 wherein each of said plurality of conductors is an electrically conductive trace adjacent one of more walls of the junction box.

22. The electrical junction system of claim 16 wherein each of said plurality of conductors is a wire.

23. An electrical junction system comprising:
a junction box having:
a plurality of interconnected walls with an opening into a cavity defined by said plurality of interconnected walls;
a threaded post secured to one of said walls of the junction box and extending through at least a portion of the cavity toward the opening, said post being secured in a way that enables the post to spin about its central axis;
a terminal for receiving a plurality of conductors of electrical power;
a plurality of electrically conductive pads; and
a plurality of electrically conductive paths interconnecting each of said plurality of conductors of electrical power with one of said conductive pads to establish electrical continuity therebetween;
a utility module having:
a front;
a back in opposed relation to said front; and
a plurality of movable contacts for establishing electrical continuity between the utility module and said plurality of electrically conductive pads;
an adjustable fastener for securing the utility module to the post substantially within the junction box cavity with the movable contacts of the utility module in electrical continuity with the conductive pads of the junction box, said adjustable fastener further including a threaded through opening formed in the utility module and sized and configured to engage the threaded post so that the depth of the utility module within the junction box cavity is adjusted as the post is spun about its central axis; and
a cover for being attached to the junction box adjacent the opening.

* * * * *